United States Patent [19]

Rhodes

[11] 4,338,555

[45] Jul. 6, 1982

[54] PULSE PAIR SERVO APPARATUS

[75] Inventor: Melvin H. Rhodes, Cedar Rapids, Iowa

[73] Assignee: Rockwell International Corporation, El Segundo, Calif.

[21] Appl. No.: 181,298

[22] Filed: Aug. 25, 1980

[51] Int. Cl.³ ............................................. G05B 13/00
[52] U.S. Cl. ................................. 318/561; 318/616; 318/632
[58] Field of Search ............... 318/561, 615, 616, 632, 318/331

[56] References Cited

U.S. PATENT DOCUMENTS

4,004,206 1/1977 Gompert ............................ 318/331
4,099,112 7/1978 Klinger ............................... 318/561

Primary Examiner—J. V. Truhe
Assistant Examiner—Eugene S. Indyk
Attorney, Agent, or Firm—Bruce C. Lutz; Howard R. Greenberg; H. Fredrick Hamann

[57] ABSTRACT

A servo mechanism is illustrated which uses pulse pairs for positioning a motor by a given increment with a velocity sensing sample and hold feedback utilized to minimize detrimental repositioning forces. The velocity sensing is accomplished after the end of the drive pulses since this sensed voltage is proportional to the magnitude of the detrimental repositioning forces.

5 Claims, 23 Drawing Figures

PULSE PAIR SERVO APPARATUS

THE INVENTION

The present invention is directed generally to electronics and more specifically to servo mechanisms.

For many years small DC motors have been used to drive servo mechanisms. However, these servo mechanisms have had several deficiencies. One is the tracking at low velocity which becomes very jerky due to torque variations. Another deficiency is that with a high loop gain the servo would follow noise on command inputs and produce large jumps in the output display. This last deficiency can be minimized by increasing the gear ratio between the motor and the display but this is a costly solution. Further, with a large gear ratio, mechanical limit stops are difficult to make without having to use slip clutches between the motor and the display.

The present concept is an attempt to provide the function of reducing servo loop gain in terms of radian/second/radian error, provide velocity limiting and not increase the torque to destructive levels at the display output. This is accomplished by using pulse pair torquing methods to drive the servo.

It was quickly ascertained that various detrimental repositioning forces prevented accurate operation with unidirectional pulses. These forces included magnetic detents and spring detents such as that occurring in a cantilever brush system where the slight rolling of the brush will allow the rotor to rotate as much as a half degree without the brush sliding on the commutator. Since the magnitude of these forces changed depending upon the position of the rotor and the direction of rotation, an adaptive feedback system had to be designed to adjust the effect of the pulse pair for specific motor conditions.

As will be realized by those skilled in the art, under theoretically perfect conditions a pulse pair will operate to accelerate a motor on the first pulse of the pulse pair and to decelerate the motor to a rest position with the second pulse. The detrimental forces would operate to move the motor either less or more than the desired amount and thus the adaptive feedback system is used to compensate whereby the motor will move a given amount with each pulse pair.

The servo system is accomplished by applying the pulse pair to the motor to reposition the motor and then sensing the generated EMF in the motor after waiting a prescribed time period. This sensed EMF is indicative of the velocity of the motor after the application of the signal. The sensed signal is sampled and an output is held for summation with the next pulse pair. The velocity sensed signal, in combination with the input signal, allows the motor to overcome the spring or other detrimental repositioning forces such that the motor may be moved to the new position. Normal position feedback is used to reduce the effect of the input signal as the motor approaches the desired position.

It is therefore an object of the present invention to provide an improved servo mechanism.

Other objects and advantages of the present invention may be ascertained from a reading of the specification and appended claims in conjunction with the drawings wherein:

DETAILED DESCRIPTION

Figure 1:
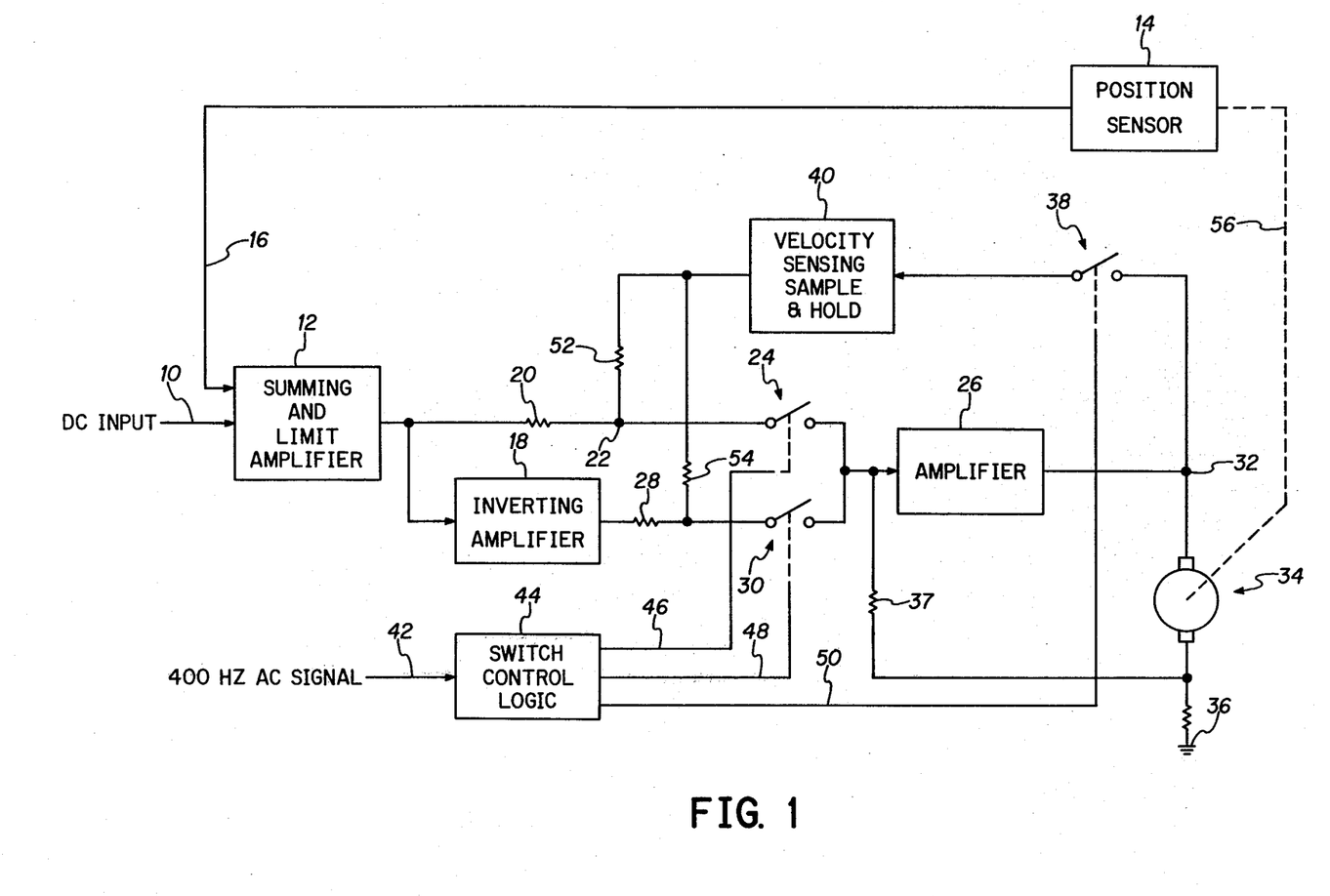
FIG. 1 is a block diagram of a direct current embodiment of the inventive concept.

In FIG. 1 a DC input 10 supplies signals to a summing and limit amplifier 12 which also receives inputs from a position sensor 14 on a lead 16. Limit amplifier 12 provides outputs to an inverting amplifier 18 and through a resistor 20 to a junction 22. Junction 22 is connected through a switch 24 to an input of amplifier 26. Inverting amplifier 18 is connected through a resistor 28 and a switch 30 to the input of amplifier 26. An output of amplifier 26 is connected to a junction 32 which is connected to one brush of a DC motor generally designated as 34 and having its other brush connected to ground 36 and through a resistor 37 in a feedback manner to the input of amplifier 26. Junction point 32 is also connected through a switch 38 to an input of a velocity sensing sample and hold circuit 40. A 400 hertz AC clock signal is input on a lead 42 to a switch control logic circuit 44 having a plurality of outputs 46, 48 and 50. Output 46 controls switch 24 while output 48 controls switch 30 and output 50 controls switch 38. An output of velocity sensing sample and hold circuit 40 is connected through a pair of resistors 52 and 54 to the inputs of switches 24 and 30 respectively. Finally, the mechanical position of motor 34 is connected via a mechanical connection 56 to the position sensor 14 for indicating its position thereto.

Figure 2:
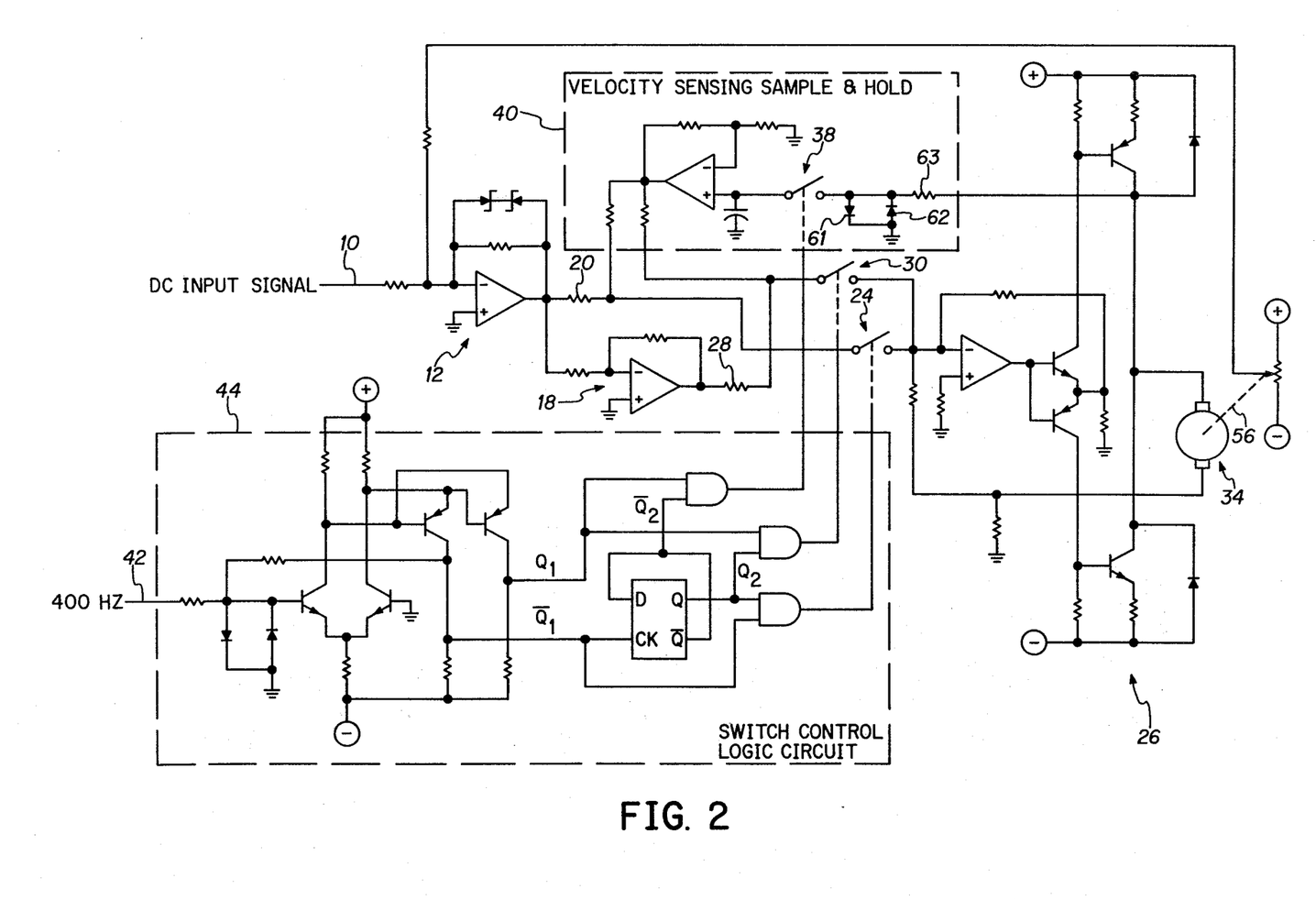
FIG. 2 is a schematic diagram of the block diagram of FIG. 1.

The same numbers used in FIG. 1 are used in FIG. 2 to designate indentical components. Since the design of the circuit is fairly straightforward, further comment on the specific circuit diagram is believed unnecessary other than to point out that diodes 61 and 62 along with resistor 63 operate to protect the switch 38 from high voltages while the high impedance value of resistor 63 permits a rapid dissipation of the inductive field of the motor 34 during time period 3 ($T_3$) as later described in conjunction with FIG. 3.

Figure 3:
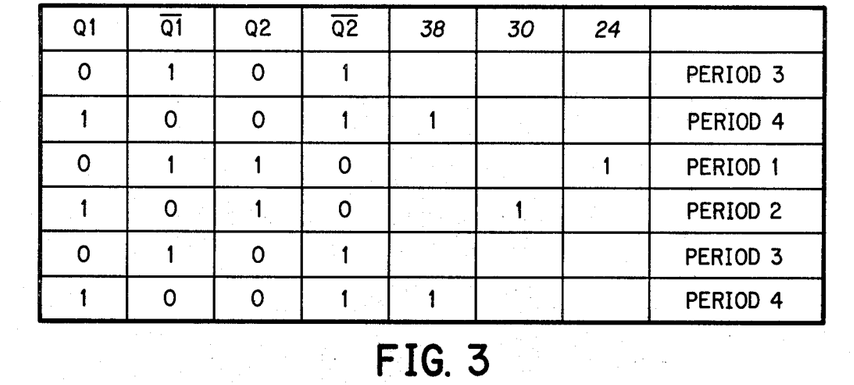
FIG. 3 is a table used in conjunction with the explanation of FIGS. 1 and 2.

FIG. 3 illustrates the logic values found in the specific circuit of FIG. 2 and indicates when the switches 24, 30 and 38 are operated during the repeating sequence of operations.

Figure 4:
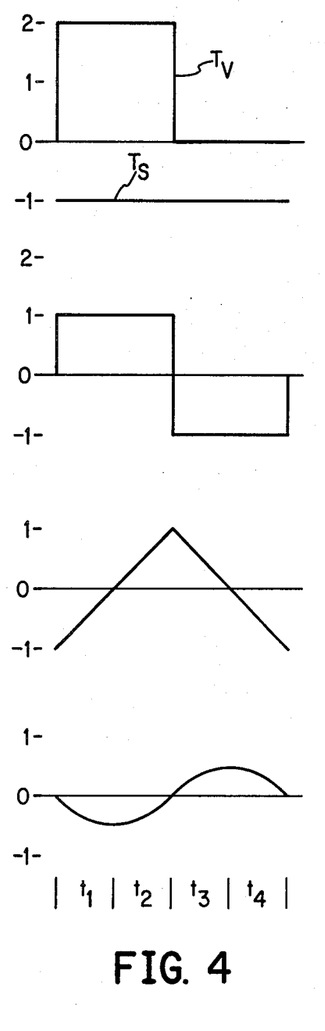
FIGS. 4a-4d, 5a-5d, and 6a-6d are waveforms used in explaining the operation of FIGS. 1 and 2.

FIG. 4 illustrates the various waveforms of force, acceleration, velocity and position for different time periods in the servo mechanism operation. FIG. 4 assumes that there is no input signal and the only forces are the spring force $T_s$ and the feedback signal $T_v$ from the velocity sensing sample and hold circuit 40. It will be noted that the total force-seconds (area) of $T_v$ is equal and opposite $T_s$. Although $T_s$ is half the amplitude, it is continuous whereas $T_v$ is periodic. Waveform 4b illustrates the summation of these two forces ($T_v$ and $T_s$) and provides the waveform based on acceleration which has a sum total of zero. Waveform 4c illustrates the velocity of the motor and shows that the motor is continually oscillating from one direction to the opposite direction with the velocity force torque accelerating it in one direction and the spring force accelerating it in the opposite direction when the velocity torque is no longer applied. Thus, the position as shown in FIG. 4d is continually changing about an axis which in one embodiment of the invention comprised a total movement of approximately 0.000025 radians. As will be observed, the timing is divided into four time segments ($T_1$ through $T_4$) with each segment comprising one-quarter of the waveform.

Figure 5:
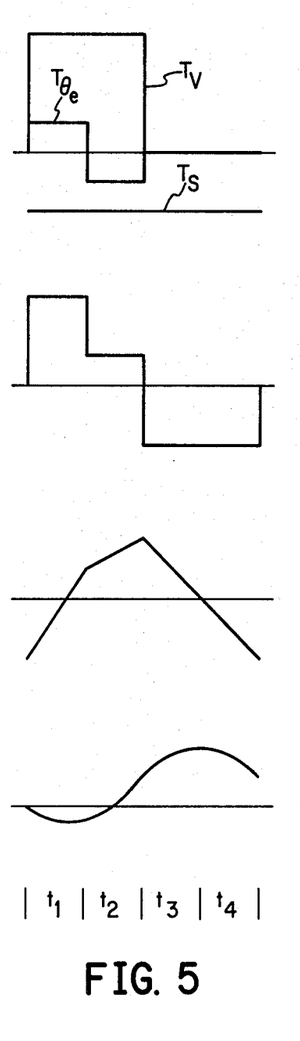

In FIG. 5 an input signal labeled as $T_{\theta e}$ standing for torque $\theta$ error and comprising a pulse pair is illustrated in 5a. This pulse waveform is summed into the total forces to produce the resultant waveform of 5b. These forces of 5b produce the acceleration of 5c and the resultant movement of the motor as illustrated in 5d.

Figure 6:
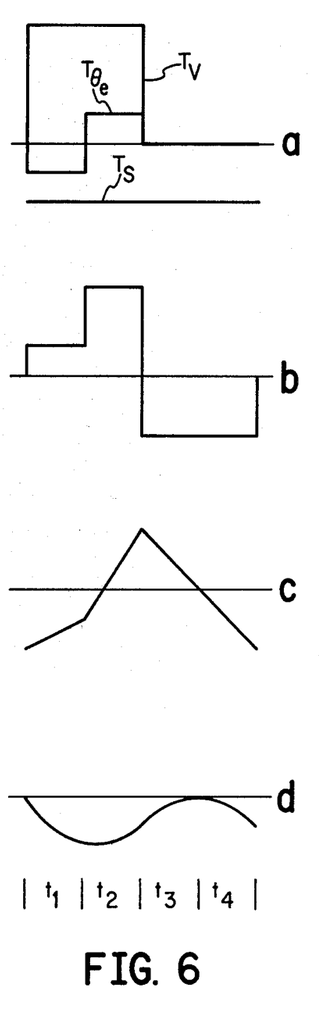

FIG. 6 illustrates an input error voltage $T_{\theta e}$ of the opposite sense to move the motor in the opposite direction and produces the waveforms illustrated.

Figure 7:
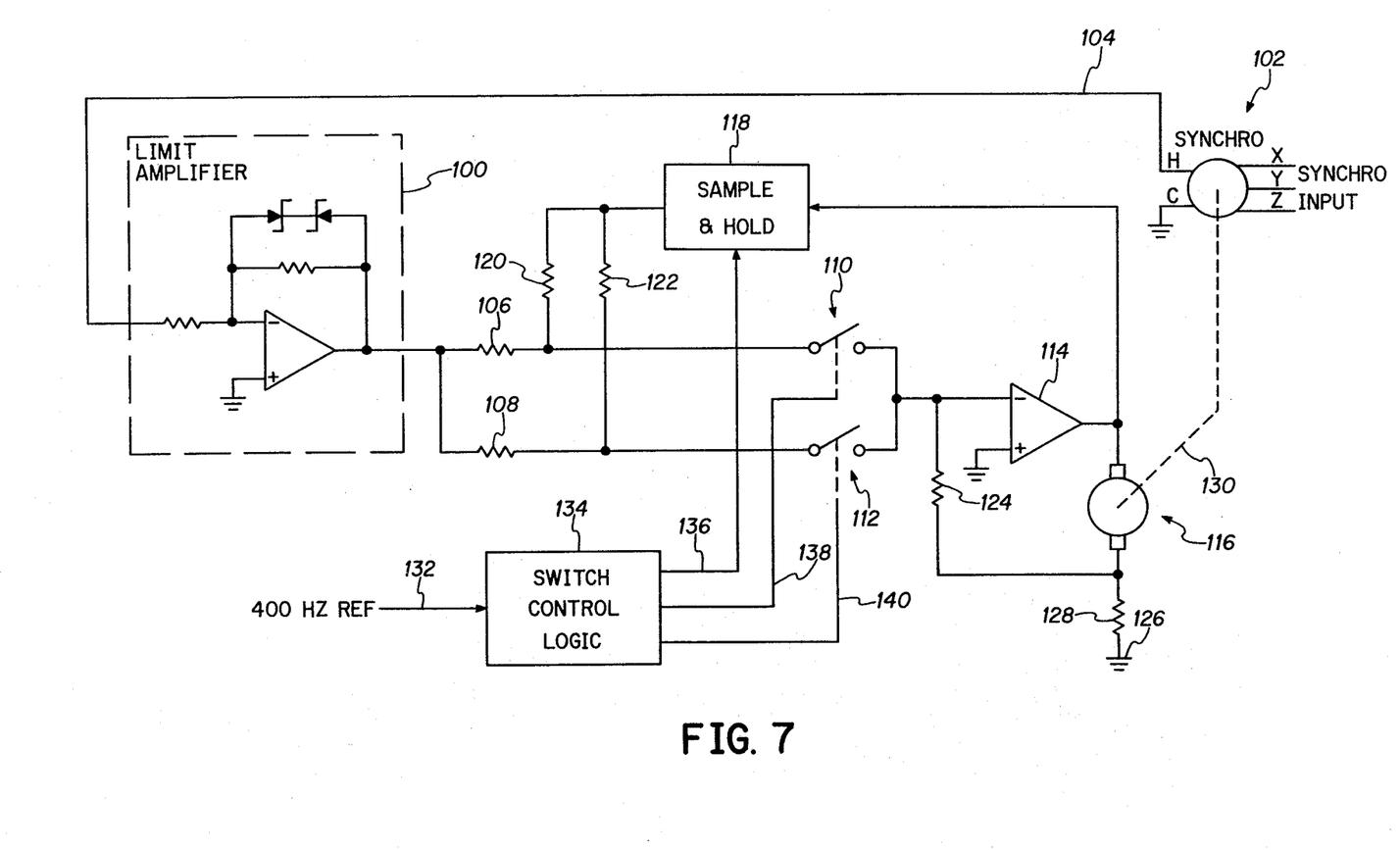
FIG. 7 is a block diagram illustrating an application of the inventive concept to AC motors.

In FIG. 7 a summing and limit amplifier 100 receives input signals from a synchro 102 on a lead 104. The summing and limit amplifier provides output signals through a pair of resistors 106 and 108 to a pair of switches 110 and 112. The outputs of the two switches 110 and 112 are summed at the input of a current amplifier 114 which is connected to a motor generally designated as 116. An output of amplifier 114 is also connected as an input to a sample and hold circuit 118. Sample and hold circuit 118 provides outputs through resistors 120 and 122 as further inputs to switches 110 and 112. The inverting input of amplifier 114 is also connected through a resistor 124 to the other side of motor 116 and connected from there to ground 126 through a resistor 128. A mechanical output of motor 116 is connected via a connection 130 to the synchro 120 which has synchro inputs labeled X, Y and Z. A 400 hertz reference or clock signal is supplied on a lead 132 to a switch control logic circuit 134 having outputs 136, 138 and 140 which are connected respectively to the sample and hold 118, the switch 110 and the switch 112.

The implementation of the circuitry for FIG. 7 is very similar to the circuitry used in the implementation of FIG. 1 as illustrated in FIG. 2. Therefore, it is believed obvious to anyone skilled in the art how to practice the invention of FIG. 7.

Figure 8:
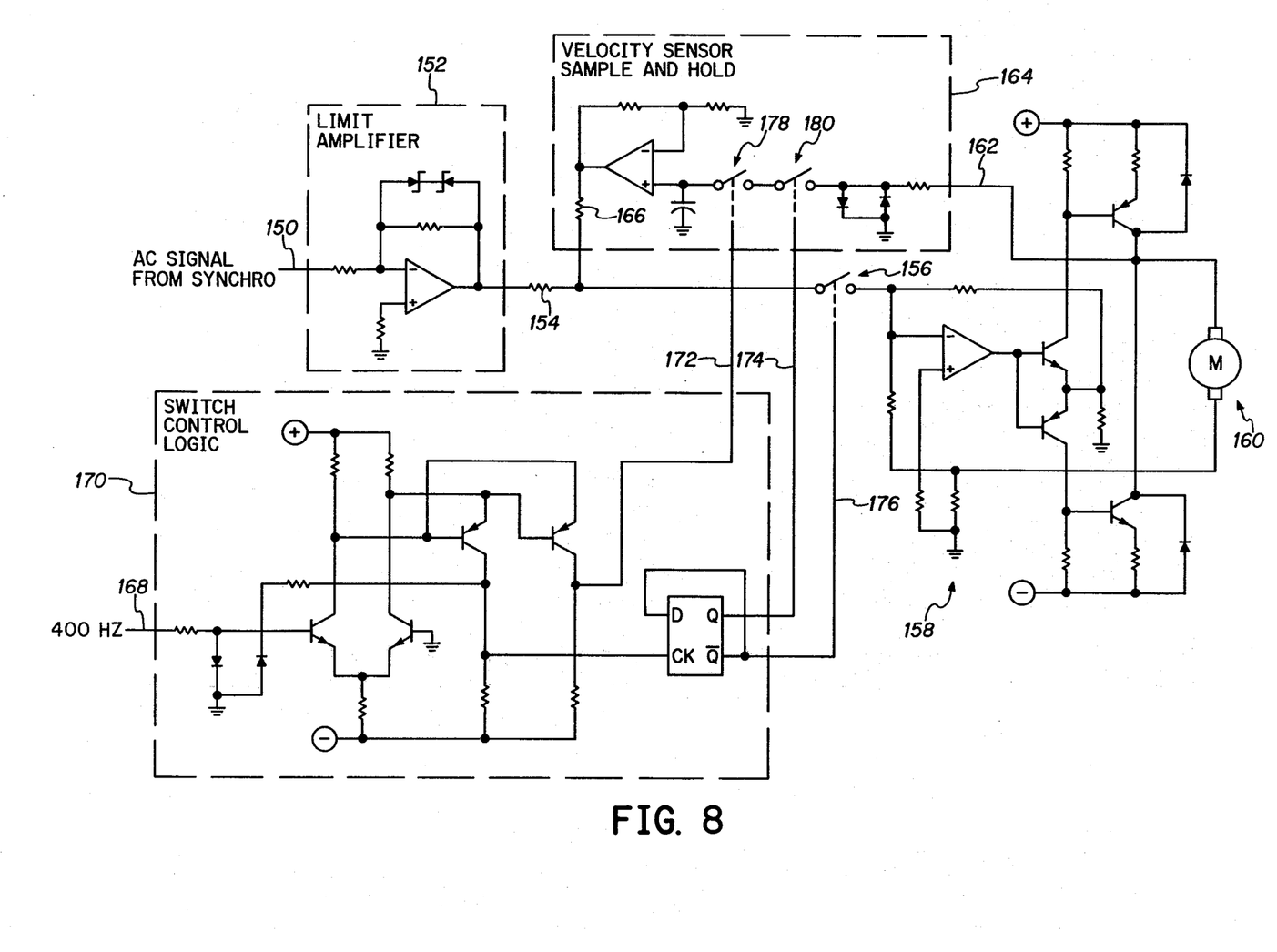
FIG. 8 illustrates a further embodiment for accomplishing the objectives of FIG. 1 with a DC motor.

In FIG. 8 an incoming error signal from a synchro is received on an input lead 150 by limit amplifier 152. Signals output by limit amplifier 152 are passed through a resistor 154 to a switch generally designated as 156. Signals from switch 156 are supplied to a current amplifier generally designated as 158 which is connected to a motor 160 in a manner similar to that illustrated in FIG. 2. Feedback signals from the motor 160 are fed via a lead 162 to a velocity sensor sample and hold circuit 164. Outputs from this circuit 164 are supplied through a resistor 166 to the switch 156. 400 hertz clock or reference signals are supplied on a lead 168 to a switch control logic circuit 170 which supplies output signals on three leads 172, 174 and 176. Lead 176 controls the operation of switch 156 while leads 172 and 174 control the operation of switches 178 and 180 within velocity sensor sample and hold circuit 164.

Figure 9:
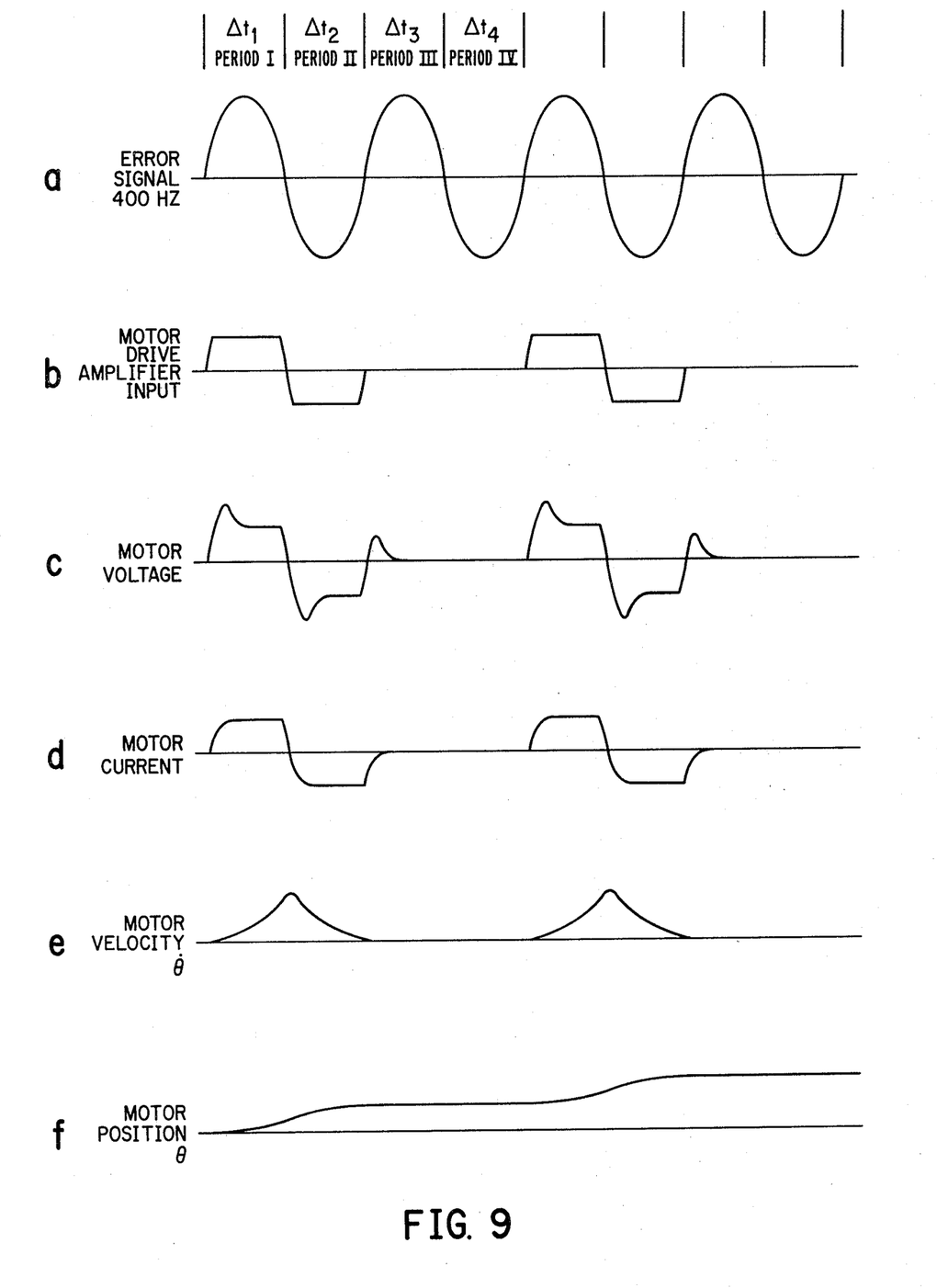
FIGS. 9a-9f is a set of waveforms used in explaining the operation of FIG. 8.

In FIG. 9 the waveforms illustrate a general condition with no detrimental respositioning forces illustrated since these would tend to complicate the illustrative waveforms. However, the detrimental forces would be similar in nature to those illustrated in connection with FIGS. 4 through 6. Waveform a of FIG. 9 illustrates the error signal being received on line 150 while waveform 9b illustrates the output from amplifier 152. Waveform 9c illustrates the voltage applied to motor 160 and waveform 9d illustrates the current therein. The velocity of the motor is illustrated in waveform 9e and the position is illustrated in waveform 9f.

OPERATION

As was previously indicated, the present invention uses a pair of pulses, the first of which gives an acceleration for a given period of time in one direction and during a second time period is in the opposite direction for deceleration.

If a single pulse drive were used, it would be very nearly like positioning an object on a flat surface by tapping it with a hammer. The hammer would deliver a pulse to the object which accelerates the object to a certain velocity and then the friction between the objective and the surface decelerates the object to zero velocity. The pulse magnitude is controlled by the weight and speed of the hammer or the material between the hammer and the object. A person swinging the hammer adjusts the pulse magnitude to fairly accurately position the objective. However, if the friction on the surface is not constant, it can be very difficult to accurately position the object. Somewhat similar conditions occur in the operation of a motor due to magnetic detents, stiction, running friction and spring forces. Each of these forces may have different magnitudes at different rotational positions and may have different magnitudes for one direction of rotation than for the other direction.

Since an objective of this servo mechanism concept was to provide a slow movement rate with a given accuracy which visually appeared at the output indicator to operate in a smooth manner without the use of a tachometer generator, it was decided that a pulse pair might profitably be used. If the pulse torque is much larger than frictional and other detrimental torques, the accuracy of the angle moved is fairly good. However, as the size of the angle to be moved by a given torque pulse pair is decreased these detrimental forces become increasingly important. Thus, to produce good predictable results requires torque pulses much larger than the frictional torques or else compensation must be made for the frictional torques.

To compensate for these detrimental forces, an integration network was added to a pulse pair drive circuit. This integration network was used to integrate the average position error and provide a current to the motor to oppose the spring torque, counteract the average frictional torque and overcome any other detrimental repositioning forces. To provide satisfactory operation when the spring torques or magnetic detent forces suddenly reverse direction, the integrator circuit has a special characteristic of being limited to a constant times the input signal magnitude with the output always having a given polarity with respect to the input. An example of an integration network which will operate satisfactorily in this inventive concept may be found in my copending application Ser. No. 158,848 filed June 12, 1980 and assigned to the same assignee as the present invention.

Referring now to FIG. 1 it will be noted that the DC input signal on 10 is summed with the position feedback signal on 16 in the summing and limit amplifier 12. The switch control logic block 44 is such that switch 24 is closed only during period 1 ($T_1$) as may be observed from FIG. 3. At this time, the signals from both the summing amplifier and the velocity sensing circuit are fed through amplifier 26 to motor 34. During time period 2 (T₂), the DC input signal is inverted by inverting amplifier 18 and fed through switch 30 and amplifier 26 to motor 34. Again, the same signal from the velocity sensing circuit is summed with the inverted signal and applied to motor 34.

None of the switches are closed during time period 3 (T₃) and any current in the motor is reduced to zero during this time period since the circuit used a high source impedance and a high voltage source.

With the rotor current reduced to near zero by the start of time period 4 (T₄), any voltage across the motor will be caused by the back EMF of the motor. This voltage is sampled by the closing of switch 38 at the start of time period T₄. This sample voltage is held by circuit 40 for the next three time periods until the next T₄ time period, at which time the back EMF is again sampled and held. The objective of this circuit is to determine any velocity caused in the rotor of motor 34 by spring torques or other repositioning forces and to cause an opposite polarity torque pulse to be applied to the motor of double the amplitude of the restraining force.

FIG. 4 shows a simple example of spring force being the only detrimental force and labeled as $T_s$. This is sampled and applied at the output of velocity sensing and hold circuit 40 from time periods $T_1$ through $T_3$. As illustrated, this is twice the amplitude of the spring force such that the average of the two forces together is a resultant zero. As previously explained, FIG. 4 illustrates a condition when there is no error ($T_{\theta e}$) DC input signal and the only signal being applied to motor 34 is from the velocity sensing circuit 40 to maintain the motor at a given average position.

As will be realized, this spring torque can resist or assist the direction the servo is commanded to move depending upon the design of the motor and the direction of movement commanded for the motor.

As illustrated, the torque signal $T_v$ is shown constant during time periods $T_3$ and $T_4$. As illustrated, this is accurate since it represents the feedback signal applied to the amplifier 26 at a point subsequent to the switches 24 and 30. However, in actual practice, the feedback signal $T_v$ does vary during time periods $T_3$ and $T_4$ to provide the compensatory signal required during the subsequent pulse pair time.

As illustrated in FIG. 5, a command signal is applied in the form of $T_{\theta e}$ which modifies a pulse signal received by the motor such that it accelerates faster during time period $T_1$ to result in a new position at the end of time period $T_4$ as illustrated in waveform FIG. 5d. When the motor command is in the opposite direction, the waveforms of FIG. 6 occur with the motor being moved in the opposite direction.

The detailed schematic diagram of FIG. 2 presents a circuit that is very versatile in that the resistors 20 and 28 can be of different values in the event that the spring forces are known to be different in one direction of rotation than in the other. Although the feedback circuit will compensate for uneven restraining forces or detrimental repositioning forces, the circuit operates more efficiently if these forces are compensated for passively rather than actively.

Substantially, the same principles are used in the operation of an AC input signal except that this AC command signal and the mechanical feedback signal are summed in a synchro such as 102 of FIG. 7. This AC signal is limited in limiting amplifier 100 whereby a pulse pair is produced for time periods $T_1$ and $T_2$ to be applied to motor 116. Again, the same sample and hold techniques would be operational to modify detrimental repositioning forces. The resistor 128, which is in series with the motor, is used to provide feedback to the amplifier to provide true current amplification. Although this actually was incorporated in FIG. 2, it was not specifically illustrated in the block diagram of FIG. 1.

FIG. 8 illustrates a different logic circuit for accomplishing the same results as FIG. 1. However, there is no opportunity for adjustment of the pulse pair amplitudes in FIG. 8. Rather, switch 156 is operable during time periods $T_1$ and $T_2$ while switches 178 and 180 operate as an AND gate so that the velocity sensor receives signals only during time period $T_4$. Otherwise, FIG. 8 is substantially identical to that of FIG. 1.

From the above, it will be observed that the inventive concept includes the idea of applying a pulse pair to a motor, and then sampling the back EMF of the motor to determine if any further movement is occurring in the motor due to detrimental torques. Any such sampled back EMF voltage is then inverted and applied to the motor in a compensatory manner so that the pulse pair positioning forces can effectively move the motor a given amount for each pulse step. This movement is achieved since the feedback signal effectively compensates for any detrimental repositioning forces.

Although I have illustrated embodiments to receive both AC and DC signals, I wish to be limited only by the scope of the appended claims wherein I claim:

1. Motor control apparatus comprising, in combination:
    motor means;
    signal supply means, connected to said motor means, for supplying position control signals to said motor means to reposition said motor means using steps of movement wherein each step comprises a predetermined radian unit;
    detrimental repositioning force compensation means, connected to said motor means, for supplying bias signals to each step control signal based on the stopping position incurred by the previous step control signal thereto to overcome the detrimental force positioning effects tending to vary the magnitude of said radian unit steps; and
    position feedback means, connected between said motor means and said signal supply means, for counteracting input signals as said motor means approaches a desired command position.

2. Servo mechanism apparatus comprising, in combination:
    input command signal means;
    motor means;
    pulse pair generating means, connected between said input command means and said motor means, for applying a plurality of pulse pair signals to said motor means to reposition said motor means in a series of steps each comprising predetermined radian units; and
    position error compensating means, connected to said motor means, for applying bias signals to each pulse pair of said plurality of pulse pair signals based on the prior pulse pair motor stopping position for minimizing the effects of detrimental repositioning forces in said motor means.

3. The method of overcoming the effects of unwanted mechanical repositioning forces in the accurate step repositioning of a motor comprising, the steps of:

applying a plurality of pulse pair signals to a motor whereby the motor is electrically accelerated and then decelerated toward a new position; and biasing each pulse pair of said pulse pair signals based on the prior pulse pair stopping position to overcome said unwanted mechanical repositioning forces on step repositioning accuracy.

4. Apparatus for overcoming the effects of detrimental mechanical forces in the accurate step repositioning of a motor comprising, in combination:

motor means;

means for applying a plurality of pulse pair signals to said motor means whereby the motor means is first electrically accelerated and then electrically decelerated toward a new position; and means for biasing each pulse pair of the pulse pair signals based on the prior pulse pair stopping position applied by said last named means to said motor means to overcome said detrimental mechanical forces on step repositioning accuracy.

5. Pulse pair motor drive apparatus comprising, in combination:

motor means;

source signal means for supplying a primary control signal;

inverting means, connected to said source signal means, for inverting said primary control signal to provide a secondary control signal;

position sensor means, connected between said motor means and said source signal means, for reducing the magnitude of said applied control signals as said motor means approaches a commanded position;

logic control means, connected to said source signal means, said inverting means and said motor means, for first momentarily applying one of said primary and said secondary control signals to said motor means and then momentarily applying the other of said primary and said secondary control signals to said motor means; and velocity sensing means, connected between said motor means and said source signal means for detecting motor movement occurring as a result of unwanted mechanical forces subsequent to each applied pulse pair and supplying feedback signals to modify the relative amplitudes of individual pulses of the pulse pair in accordance with detected motor movement.

* * * * *